United States Patent Office 3,122,291
Patented Feb. 25, 1964

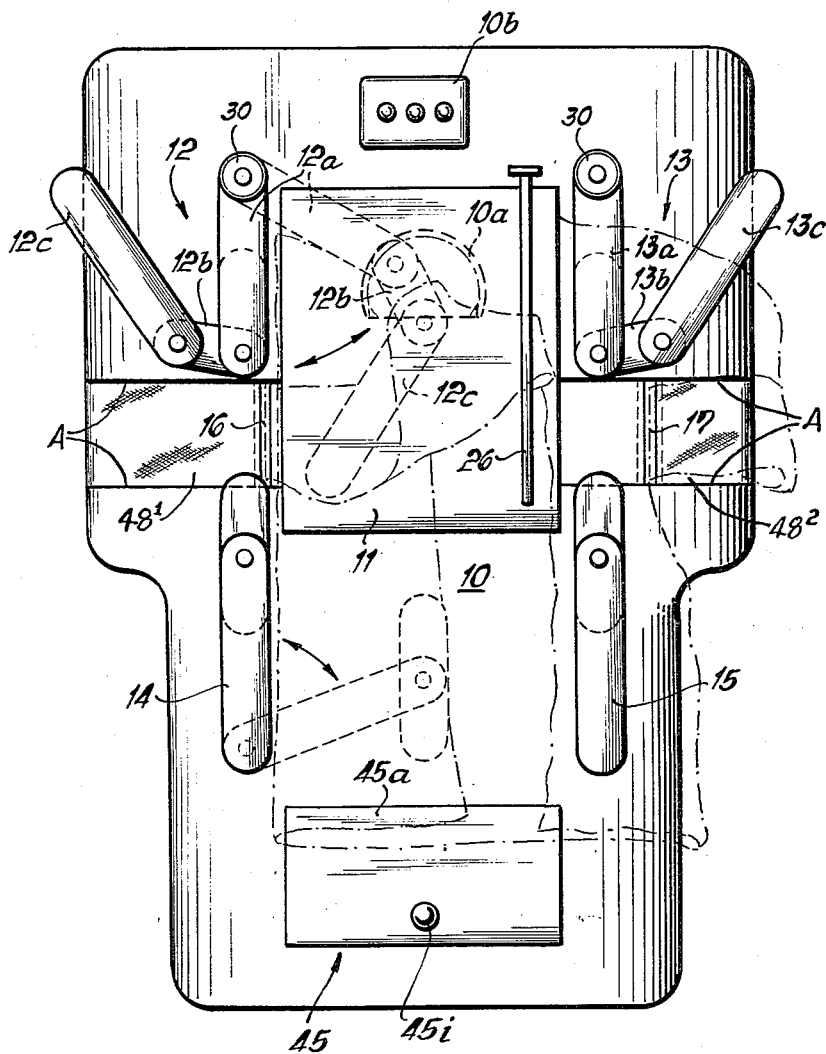

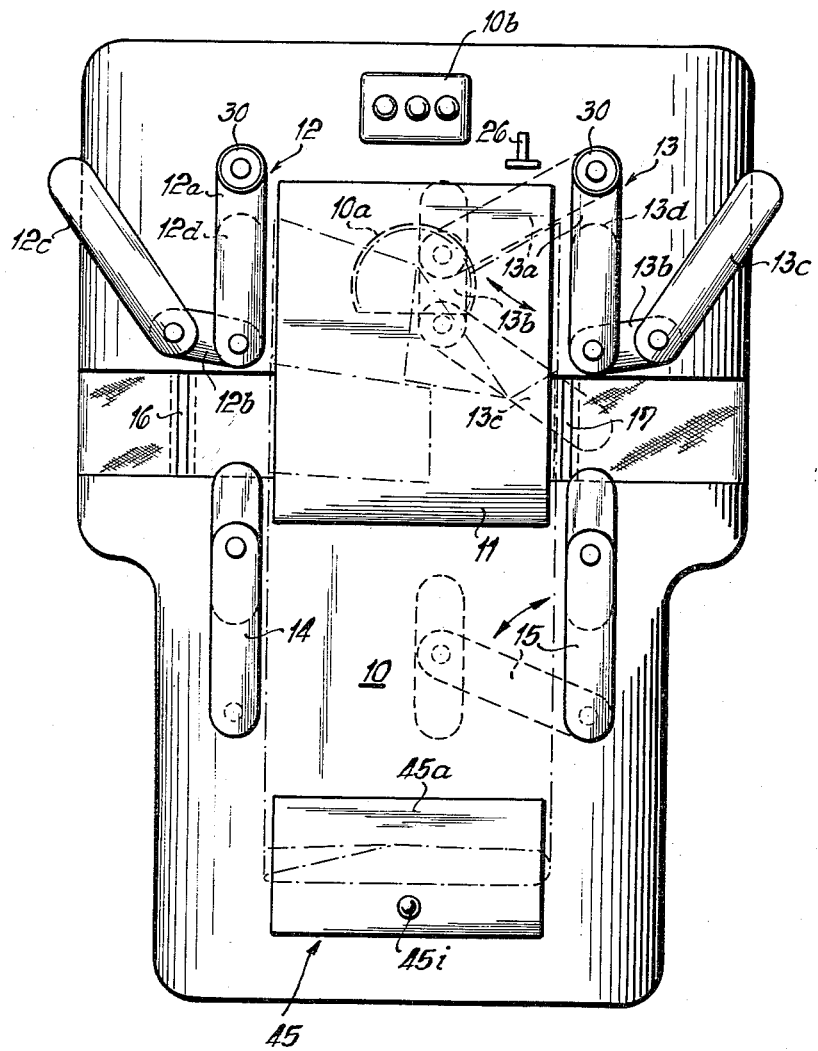

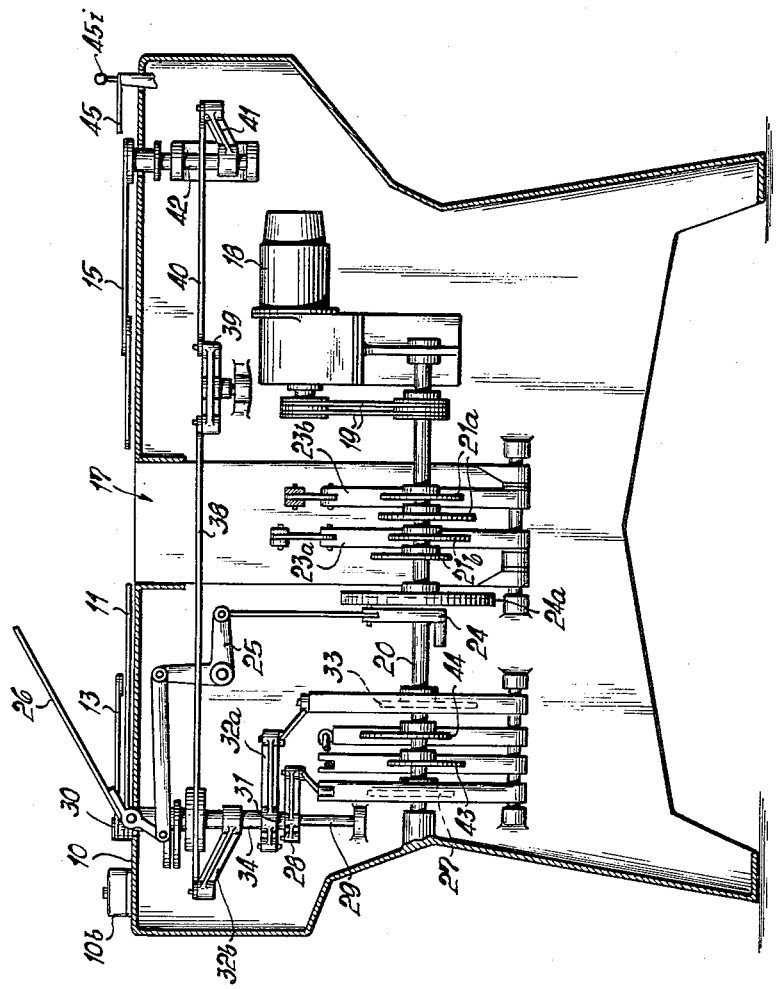

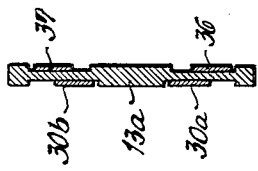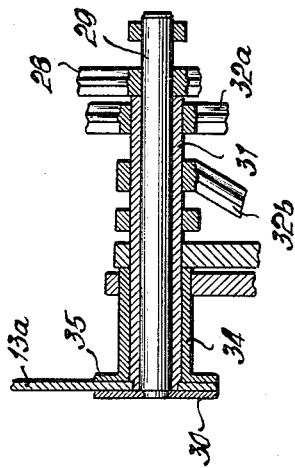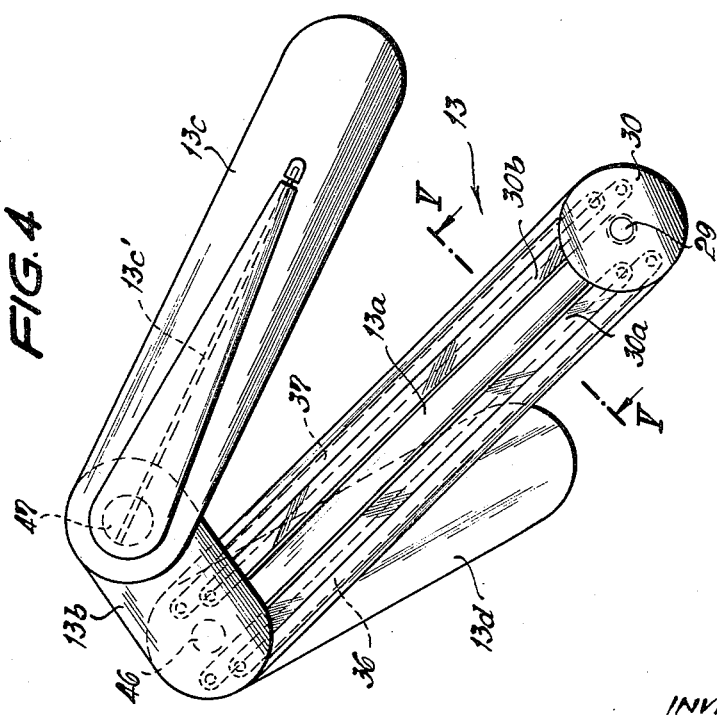

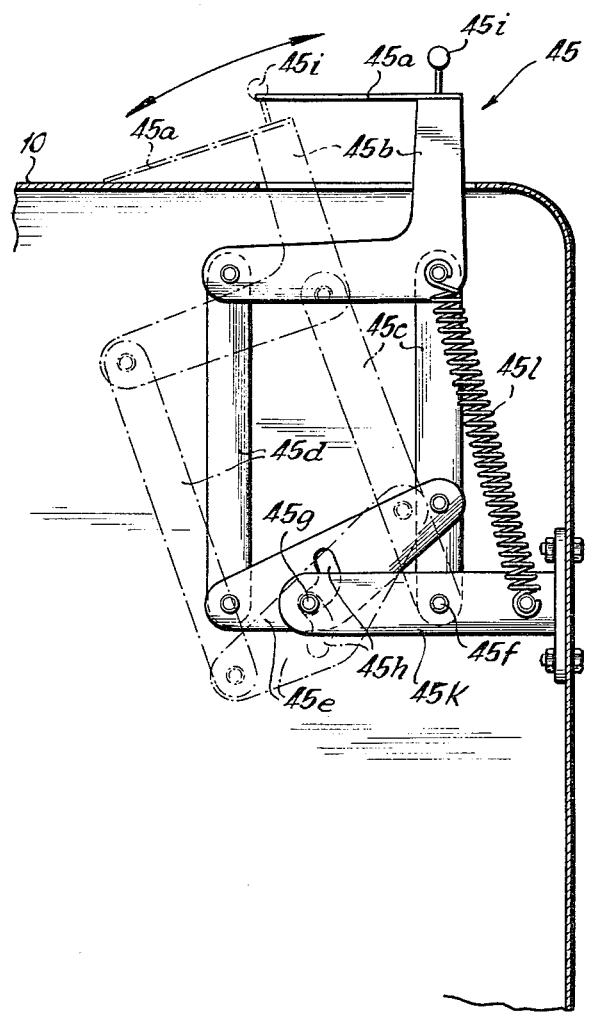

3,122,291
APPARATUS FOR FOLDING GARMENTS,
SHIRTS AND THE LIKE
Gerhard Wittenberg, Bielefeld, Walter Seidensticker, Brackwede, Gerhard Hippe, Bielefeld, and Günter Twelsiek, Altenhagen, Germany, assignors to Seidensticker Herrenwaschefabriken G.m.b.H., Bielefeld, Germany
Filed June 14, 1961, Ser. No. 117,166
16 Claims. (Cl. 223—37)

This invention relates to a device for folding a garment with long sleeves ending in cuffs, especially men's dress shirts, nightgowns, blouses or the like.

In the folding devices known in the art, the body portion of a garment with long sleeves and cuffs is first folded together whereupon the sleeves are folded over the body portion. When folding garments by known mechanical means, the cuffs are situated below or between the body portion and have to be folded by hand over the body portion, this is disadvantageous and time-consuming.

It is the object of the present invention to provide a device with which garments with long sleeves ending in cuffs, especially dress shirts, nightgowns, blouses or the like are folded and laid together so that the cuffs are quite readily situated on the front side of the body portion of the garment.

To achieve this object, the invention provides a device which comprises a substantially horizontal work surface, a folding plate tiltably mounted on the work surface and around which a garment is to be folded, a first pair of folding arms composed of several parts and pivotally mounted on the work surface near one end thereof at both longitudinal sides of said folding plate, the parts of said folding arms being movable for folding said garment around said folding plate, and a pair of holding means for holding the cuffs of the garment during the folding operation to cause said cuffs to be disposed on the front side of the body portion of the garment.

The cuffs are put in these holding means and firmly held therein while the garment lying with its front side on a work surface is folded together. After completion of the folding operation, the cuffs have assumed their right positions on the front side of the body portion of the garment and can be fixed thereon without difficulty.

In an exemplary embodiment of the invention the parts of the first pair of folding arms are movable independently of each other. Each holding means comprises two stretching elements, for example stretching bars, which are adapted to be pressed against each other thereby to hold a cuff itself or the shirt sleeve portion adjacent the cuff between them. These stretching elements are preferably mounted for movement transversely to the folding plate. Due to this, the positions of the cuffs can be changed during the folding whereby the folding operation is facilitated. Expediently, a common driving shaft has cam discs mounted thereon, and the stretching elements of the holding means are positively connected to the driving shaft by means of the cam discs.

Preferably, lengths of a band mask the paths of travel of the pair of holding means. This band is movable and may connect the pair of holding means.

Furthermore, a pivotally mounted holding arm is preferably provided for retaining the partly folded garment and is movable above the folding plate. Expediently, the common driving shaft has a further cam disc mounted thereon, and the holding arm is connected to the driving shaft by means of the cam disc.

A second pair of folding arms is preferably provided near the opposite end of the work surface for folding the end portion of the garment opposite the collar end thereof and is composed of several parts. This second pair of folding arms cooperates with the first pair of folding arms.

A preferred embodiment of the invention will now be described by way of example and with reference to the accompanying drawings, in which:

FIG. 1 is a top plan view of a folding device according to the invention showing a partially folded shirt by dash lines;

FIG. 2 is a similar view of the folding device of FIG. 1, but showing the shirt in a different folded state; only a fragmentary portion of a holddown arm being shown;

FIG. 3 is a schematic longitudinal section through the folding device;

FIG. 4 is a top plan view of a multiple-part folding arm;

FIG. 5 is a cross-section through the folding arm taken on line V—V of FIG. 4;

FIG. 6 is a longitudinal section through a multiple shaft for controlling the folding arms and a holding arm;

FIG. 8 is a side elevational view of a holding device.

Figure 7:
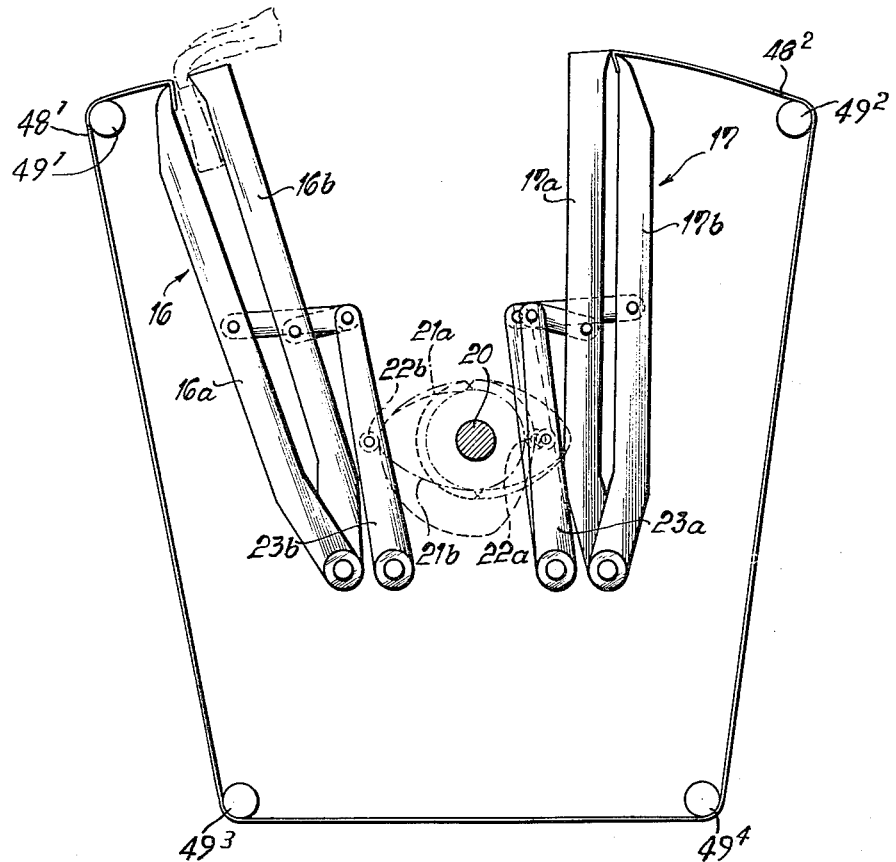
FIG. 7 is a schematic side elevational view of stretching elements partly in opened and partly in closed positions.

FIGS. 1 and 2 show a device for folding a garment with long sleeves and cuffs which has an upper, substantially horizontal work surface 10 on which a known folding plate 11 is tiltably mounted.

At each longitudinal side of this folding plate 11, near one end of the work surface 10, a multiple-part folding arm 12 and 13, respectively, is mounted for pivotal movement in a plane extending parallel to the work surface 10. Near the opposite end of the work surface 10 two further multiple-part folding arms 14 and 15 are pivotally mounted. These folding arms 14 and 15 serve to fold together with the folding arms 12 and 13 a garment around the folding plate 11.

Between the folding arms 12 and 13, on the one hand, and the folding arms 14 and 15, on the other hand, two gripping or holding means 16 and 17 are arranged to move transversely to the longitudinal direction of the folding plate 11. In these holding means 16 and 17 the shirt sleeve portions adjacent the cuffs or the cuffs themselves can be clamped in such a manner that the cuffs project downwardly from the work surface 10 into the interior of the folding device and remain in their positions during the folding operation.

As shown in FIG. 3, the folding device is equipped with a driving motor 18, preferably an electromotor, which is arranged to drive a driving shaft 20 through the intermediary of a transmission means 19 which may be a V-belt, a chain or the like. On the driving shaft 20 a plurality of cam discs of different shape are arranged in series which cause the individual parts of the folding device to move. Two cam discs 21a and 21b, respectively, serve for moving the holding means 16 and 17. To this end, as can be seen from FIG. 7, two guide rollers 22a and 22b, respectively, are arranged to travel one along each of the cam discs 21a and 21b and are connected each with one of two lever arms 23a and 23b. These lever arms 23a and 23b serve to guide by means of intermediary members two pairs of stretching bars 16a, 16b and 17a, 17b, respectively, of the holding means 16 and 17. The stretching bars 16a and 16b as well as the stretching bars 17a and 17b are linked together at their lower ends, so that each pair of stretching bars can be opened for receiving the cuffs and subsequently closed for holding the depending cuffs. This is performed in dependence upon the turning movement of the common driving shaft 20. In FIG. 7 the construction and arrangement of the holding means 16 and 17 formed by the stretching bars 16a, 16b and 17a, 17b is schematically illustrated. Each of these holding means 16 and 17 is adapted for movement in a transverse guideway A extending from the folding plate 11 on the right and left to the marginal zones of the work surface 10 (see FIG. 1).

Secured to the outer stretching bars 16a and 17b of the holding means 16 and 17 are textile band portions 48$^1$ and 48$^2$, respectively, extending downwardly over reversing rollers 49$^1$ and 49$^2$ and interconnected in the center through further reversing rollers 49$^3$ and 49$^4$. In the position shown in FIG. 7 on the right, the band portion 48$^2$ masks the otherwise open transverse guideway A of the holding means 17. In its masking position this band portion 48$^2$ serves the purpose of maintaining the continuity of the work surface 10 to prevent parts of the garment from entering in an undesired manner the downwardly open transverse guideway A. As shown in FIG. 3, a lever 24 is arranged to control through the intermediary of an elbow lever 25 the movement of a holding arm 26 which is pivoted at one end so as to be movable upwardly and downwardly above the folding plate 11 corresponding to the folding operation. The lever 24 can be controlled by a cam disc 24a mounted on the driving shaft 20.

A cam disc 27 is arranged to control an articulated lever 28 engaging an innermost shaft 29 of three telescoped vertical shafts 29, 31 and 34.

As shown in FIGS. 4 and 6, the innermost shaft 29 of the three vertical shafts can drive an upper rotatable disc 30 to which two parallel guide or pull rods 30a and 30b are linked which serve as moving means for parts 13a, 13b and 13c of the folding arm 13. The pull rods 30a and 30b are positioned in depressions in the upper side of the part 13a of the folding arm 13, which part 13a is fixed directly to the middle hollow shaft 31 of the three vertical shafts which can be controlled by a cam disc 33 (FIG. 3) through the intermediary of an articulated lever 32a.

The outer hollow shaft 34 of the three vertical shafts which surrounds the upper portions of the medium hollow shaft 31 and the innermost shaft 29 is arranged to drive a lower rotatable disc 35 to which likewise two parallel guide or pull rods 36 and 37 are linked which are positioned in depressions in the underside of the part 13a of the folding arm 13 and serve to move a part 13d of the folding arm 13 acting as a cantilever. FIG. 5 shows the positions of the pull rods 30a, 30b, 36 and 37 in the part 13a of the folding arm 13 connected to the medium hollow shaft 31.

The part 13d of the folding arm 13 may be expediently provided for improving the folding operation. As can be seen from FIG. 4, the part 13d is arranged to rotate about a pivot 46, so as to assume a position parallel to the longitudinal axis of the folding plate 11 when the folding arm 13 is in its medium position shown in dot-dash lines in FIG. 2. The same applies to the folding arm 12 which may be provided with a part 12d (FIG. 2).

As shown in FIG. 3, an articulated lever 32b surrounding the medium hollow shaft 31 is arranged to operate a rod 38, so as to turn a shaft 42 for the folding arm 15 through the intermediary of a disc 39, a rod 40, and an articulated lever 41.

Cam plates 43 and 44 are mounted on the driving shaft 20 and connected to further three telescoped vertical shafts for moving the folding arms 12 and 14, which shafts are arranged symmetrically to the three vertical shafts 29, 31, and 34.

The driving shaft 20 thus causes the holding means, the individual folding arms and the holding arm to move in exactly determined dependence upon each other.

The folding arms 12, 13, 14, and 15, particularly a part 12c (FIG. 2) of the folding arm 12 and the part 13c of the folding arm 13, are equipped with springs, i.e., they are acted upon by compression or tension springs preferably yielding to both sides. This enables the folding arms to be adapted to different lengths of shirt sleeves. For example, as can be seen from FIG. 4, a spring bar 13c' is passed through a pivot 47 and is positioned in a substantially wedge-shaped depression provided in the part 13c of the folding arm 13. The spring bar 13c' is braced with its free end in the part 13c of the folding arm 13. When the part 13c is acted upon by lateral forces, the spring bar 13c' is slightly bent, thereby causing the part 13c of the folding arm 13 to yield. As soon as the lateral stress ceases, the part 13c is returned into its normal position by the action of the spring bar 13c'.

The mode of operation of the above-described folding device is as follows:

For example, a new dress shirt with long sleeves and cuffs is laid in buttoned-up condition with its front side on to the work surface 10, the collar of the shirt being placed into a recess 10a (FIG. 1) provided for this purpose in the work surface between the folding arms 12 and 13. At the initiation of the working cycle, the holding means 16 and 17 are in a central position, i.e. disposed adjacent the opposed marginal regions of the folding plate 11. Both cuffs of the shirt are then pushed between the stretching bars 16a, 16b and 17a, 17b, respectively, in such a manner that they project into the interior of the folding device.

After straightening the shirt collar, a relatively long folding cardboard which has a transverse folding groove in its middle portion, is placed on to the rear side of the shirt body over the entire length thereof, and the folding plate 11, e.g. a folding sheet, which has previously been tilted upwardly off the work surface 10, is tilted downwardly.

After switching on the driving motor 18 by actuating a switch of a switch board 10b (FIG. 1) the stretching bars 16a, 16b and 17a, 17b, respectively, of the two holding means 16 and 17 close, moving towards the middle of the folding device thereby to bring the cuffs up to the folding plate 11.

At the same time the left-hand side portion of the shirt is pushed parallel to the longitudinal axis of the folding plate 11 over the folding plate and the exposed portion of the cardboard by means of the folding arms 12 and 14. In FIG. 1, the folding arms 12, 13, 14, and 15 are shown in full lines in their initial positions. As already described, after switching in the driving motor, the folding arms 12 and 14 move in the direction of the arrows towards the middle of the work surface 10 until they have reached their final positions shown by dot and dash lines. The position the shirt assumes in the final positions of the folding arms 12 and 14 is indicated by dash lines in FIG. 1.

After the left-hand side portion of the shirt has been folded, the holding arm 26 first upwardly directed is automatically lowered and retains the folded shirt portion. While the folding arms 12 and 14 slowly return into their initial positions, the folding arms 13 and 15 push the right-hand side portion of the shirt over the left-hand side portion thereof until they have reached their final positions shown by dot and dash lines in FIG. 2. Thereafter the folding arms 13 and 15 return into their initial positions. The holding means 16 and 17 open and release the cuffs held during the folding operation so that same are situated on the front side of the body portion of the shirt. The shirt portion folded around the exposed portion of the cardboard is then folded on to the rear of the collar end portion of the shirt. Since the body portion of the garment is fixed or anchored by the folding plate 11, the body of the garment will not be disturbed during action of arms 12–15 and thus wrinkling is substantially eliminated.

The folded shirt is drawn off the folding plate and the folding plate is tilted upwardly, the holding means 16 and 17 automatically returning into their initial positions due to their connection to the shaft 20 driven by the motor 18. The holding arm 26 is controlled by cam disc 24a and the lever 24 which are constructed in such a manner that the holding arm 26 will be raised and lowered as required during the folding operation of the garment. Thus, after removing the folded garment, the holding arm is returned to its raised or initial position by the cam disc 24a.

The folding device is thus ready for a new folding operation.

The folding device according to the invention is characterized by a great simplicity and a substantially complete mode of operation. By the novel gripping or holding means, the cuffs are ensured to be folded on to the front side of the body portion of the readily folded shirt in a manner hitherto not achieved mechanically.

In order to limit the cardboard covering the rear side of the shirt during the folding operation to the collar end portion of the shirt, it may be expedient to hold the middle section of the opposite end portion of the shirt to be folded during the folding operation. To this end, a movable holding device 45 (FIG. 8) is expediently provided at the end of the folding device situated adjacent the folding arms 14 and 15. This holding device 45 has, for example, a flat plate 45a which is about as broad as the folding plate 11, as can be seen particularly from FIG. 1. The plate 45a is pivotally mounted in such a manner that prior to pressing down the shirt on the work surface, it moves first substantially parallel to the work surface at a certain distance thereto, then inclines towards the shirt and the work surface immediately before assuming its holding position and then presses a more or less broad middle section of the end portion of the shirt opposite the collar end thereof down on to the work surface.

FIG. 8 shows a preferred construction and pivotal mounting of the holding device 45.

In its rest position, the plate 45a is slightly horizontally spaced from the work surface 10. It is fixed to an elbow lever 45b projecting only partially beyond the work surface and mounted with its remaining portion inside the housing of the folding device below the work surface. The elbow lever 45b is carried by two links 45c and 45d which are interconnected at their opposite ends by a connecting link 45e. The link 45c can be turned about a pivot 45f fixedly mounted in a bracket 45k secured to the housing of the folding device. The movement of the links 45c and 45d can be controlled by a pin 45g, likewise fixedly mounted in the bracket 43a, which engages in a slot 45h in the connecting link 45e. The slot 45h has an angular configuration whereby it is achieved that when operating a knob 45i of the plate 45a against the action of a tension spring 45l the plate 45a is first moved substantially parallel to the work surface 10, the distance between the work surface and the plate slightly decreasing. Immediately before the plate 45a has reached its clamping position, the pin 45g enters the portion of the slot 45h which is directed upwardly. During the following movement of the plate 45a the connecting link 45e is lowered. This causes the plate 45a to incline towards the work surface and to engage the shirt lying on the work surface. The clamping position of the holding device is indicated in dot-dash lines in FIG. 8.

After the shirt has been folded, the plate 45a is moved out of the folded shirt into its initial position by retracting the knob 45i. Then the end portion of the folded shirt opposite the collar end thereof can be folded on to the rear of the collar end portion of the shirt.

The invention may be embodied in other specific forms without departing from the spirit or the essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

We claim:

1. Apparatus for folding garments such as shirts or the like in which said garments include a body having a front portion and sleeves terminating in cuff portions, comprising a work surface including recesses therein for receiving a garment front face down, a folding plate tiltably mounted on said apparatus over said work surface for engaging the garment, laterally disposed opposed pairs of folding arms displaceably mounted on said apparatus for folding the garment, characterized by opposed cuff holding means displaceably supported on said apparatus for stretching the garment sleeves from the cuff portion thereof while a folding operation occurs, said apparatus including lateral, transverse guideways on said work surface and parallel thereto for receiving said cuff holding means therein.

2. The structure of claim 1 wherein one of said pair of folding arms is movable independently of the other.

3. The structure of claim 2 including a common drive shaft on said apparatus, cam discs on said drive shaft drivingly connected to said holding means.

4. The structure of claim 3 including a flexible band connected to and extending laterally from said holding means and masking said transverse guideways for movement with said holding means.

5. The structure of claim 4 wherein said holding means are mounted for movement transversely of said folding plate in alignment with said work surface.

6. The structure of claim 5 including first levers having rollers engaging said cam discs, said holding means comprising pairs of levers pivotally connected to each other, each of one of said pair of levers being pivotally connected to one of the respective first levers.

7. The structure of claim 1 in which said folding arms are pivotally mounted at lateral side margins of said folding plate, said folding arms including a plurality of levers mounted on a common axis of rotation and movable independently of each other.

8. The structure of claim 7 in which said apparatus includes a common drive shaft, and a plurality of axially aligned, telescopically engaged folding-arm operating shafts disposed normal to said work surface and drivingly connected to said common drive shaft.

9. The structure of claim 8 including a drive cam on said common drive shaft independently connected to an innermost one of said folding arm-operating shafts.

10. The structure of claim 9 including a mounting disc on said innermost of said arm-operating shafts, and parallel guide rods connected to said folding arms and said mounting discs.

11. The structure of claim 10 in which said arm-operating shafts include a hollow intermedial shaft journaled on said innermost shaft, said guide rods being supported in one part of said folding arms.

12. The structure of claim 11 in which said hollow intermediate shaft is connected for independent movement to said common drive shaft.

13. The structure of claim 12 including a tubular outer shaft journaled on said intermediate shaft, said outer shaft including a lower mounting disc pivotally connected to a second pair of guide rods supported for movement on the undersurface of said one part of said folding arms.

14. The structure of claim 13 wherein said pairs of folding arms are connected to an elongated connecting rod extending beneath said work surface and to the intermedial folding arm-operating shafts for integrating movement thereof.

15. The structure of claim 14 in which said folding arms include spring means maintaining the lever arms in a normal position.

16. The structure of claim 15 in which said spring means comprises elongated leaf springs extending along said folding arms and anchored at the folding arm-operating shaft.

References Cited in the file of this patent
UNITED STATES PATENTS

| | | |
|---|---|---|
| 1,873,954 | Cooper | Aug. 30, 1932 |
| 2,028,658 | Gray | Jan. 21, 1936 |
| 2,921,726 | Maxwell et al. | Jan. 19, 1960 |
| 3,013,704 | Freeman | Dec. 19, 1961 |